United States Patent [19]
Martin

[11] Patent Number: 5,939,635
[45] Date of Patent: Aug. 17, 1999

[54] MICROMECHANICAL PRESSURE SENSOR WITH IMPROVED RANGE

[75] Inventor: Jacob H. Martin, Wellesley, Mass.

[73] Assignee: Varian Inc., Palo Alto, Calif.

[21] Appl. No.: 08/982,769

[22] Filed: Dec. 2, 1997

[51] Int. Cl.$^6$ .................................................. G01L 11/00
[52] U.S. Cl. ................................................ 73/702; 73/703
[58] Field of Search ............................ 73/702, 703, 704, 73/1.57, 1.66

[56] References Cited

U.S. PATENT DOCUMENTS

| | | | |
|---|---|---|---|
| 4,342,230 | 8/1982 | Okamura | 73/702 |
| 4,479,070 | 10/1984 | Frische et al. | 73/703 |
| 4,644,804 | 2/1987 | Ramm et al. | 73/702 |
| 4,747,311 | 5/1988 | Hojoh | 73/703 |
| 4,813,271 | 3/1989 | Greenwood | 73/702 |
| 4,995,263 | 2/1991 | Stocker | 73/702 |
| 4,995,264 | 2/1991 | Stocker et al. | 73/702 |
| 5,000,050 | 3/1991 | Hetrick | 73/704 |
| 5,060,526 | 10/1991 | Barth et al. | 73/702 |
| 5,136,885 | 8/1992 | Liebermann et al. | 73/702 |
| 5,142,912 | 9/1992 | Frische | 73/702 |
| 5,228,344 | 7/1993 | Hojoh | 73/702 |
| 5,528,939 | 6/1996 | Martin et al. | 73/702 |
| 5,578,759 | 11/1996 | Clayton | 73/702 |

*Primary Examiner*—Harshad Patel
*Assistant Examiner*—Robin Clark
*Attorney, Agent, or Firm*—Bella Fishman

[57] ABSTRACT

The workable range is extended into lower pressure region for micromechanical pressure sensors of the kind having a vibrating mass in proximity of a stationary surface by increasing the amount of squeeze damping. The amount of squeeze damping is increased by using the symmetry of a circular disk-shaped vibrating mass and restricting or changing the flow path of the gas in and out of a squeeze damping space. A circular vibrating mass is supported through an annular spring by a support ring attached to the substrate surface by a plurality of mesas which serve to block the gas flow into and out of the squeeze damping space between the mass and the substrate surface. The amount of squeeze damping may be increased by providing the support ring which completely encloses the squeeze damping space with the vibrating mass having a hole through which the gas may enter and leave the space. A top electrode may be provided above and in close proximity of the vibrating mass to achieve smaller clearances between the substrate electrode and the mass. The vibrating mass may be caused to vibrate parallel to the surface of the substrate in conjunction with a top electrode to measure higher pressures.

11 Claims, 5 Drawing Sheets

MICROMECHANICAL PRESSURE SENSOR-WITH IMPROVED RANGE

BACKGROUND OF THE INVENTION

This invention relates to a micromechanical pressure sensor of the type known as the molecular drag gauge with an improved range, and more particularly to an improvement to the type of micromechanical pressure gauges disclosed in the U.S. Pat. No. 5,528,939 issued Jun. 25, 1996 and assigned to the Assignee of the present invention.

For the measurement of pressure in vacuum systems, it has been known to use a molecular drag gauge which makes use of the property that the drag force produced by a gas at a low pressure on an object moving therethrough is proportional to the pressure of the gas. Aforementioned U.S. Pat. No. 5,528,939, which is hereby incorporated by reference, disclosed micromechanical pressure gauges of this kind adapted to cause one or more members to vibrate electrostatically in the proximity of a stationary member and to measure the molecular drag force that operates to damp the vibrations.

It is desirable to have pressure gauges with an extended sensor range because, although typical vacuum systems utilize two or more types of gauges each having its own range of usefulness, switching between different gauges is not only troublesome but also inclined to introduce reading discontinuities.

SUMMARY OF THE INVENTION

It is an object of this invention to extend the range of molecularly damped micromechanical pressure gauges of the type described above, and more particularly to extend the range to the lower pressure region.

The range of pressure measurement is extended at the lower pressure end by the enhancement of, so-called, "squeeze damping" which occurs, for example, when a flat plate in close proximity of and parallel to a stationary flat surface is moved closer thereto and farther away therefrom in an oscillatory manner such that gas molecules are pumped out of the space between the plate and the surface and then sucked back in. This pumping action puts a drag on the plates, and if the gas is restricted of its motion so as not to flow in or out as fast, the damping can be further increased.

Pressure sensors according to this invention are structured basically as described in the U.S. patent '939 and are designed to have an extended range by increasing the amount of squeeze damping, for example, through symmetries that improve the flatness of the gauge components and hence allow larger plates to operate at close spacing, comprising a micromechanical mass-and-spring system that is damped in proportion to the pressure of the gas which surrounds it, having one or more vibrating plates disposed proximally to a stationary member. The range extension to lower pressures, according to the present invention, is provided due to increasing the squeeze damping. One way of accomplishing this is to increase the size of the vibrating plate, or the squeeze damping plate, and to reduce the separation between the vibrating plate and the stationary member because the amount of damping is proportional to $(w/d)^3$, where w is the shortest distance across the vibrating plate (as a measure of its size) and d is the distance between the vibrating plate and the stationary member. There are, however, practical limitations because a large thin plate tends to curl. If the plate is made larger, for example, it eventually becomes necessary to also increase the clearance to prevent the warped plate from touching the stationary member such that the net change in the damping would be little.

This problem can be mitigated by placing support springs around the mass in opposing pairs and assembling the mass-and-spring system so as to be in a slight tension. The multiple pairs of opposed spring pairs can be increased in number and size until the extension becomes a continuous flat spring. The mass of the vibrating member, for example, may be a circular plate, the support spring being an annular plate therearound. This geometry is useful on other micromechanical applications, and is particularly useful in the pressure sensor application because of its plate flattening qualities when the spring is under tension. It is desirable that the mass plate stay flat while vibrating, which is achieved by making the mass substantially thicker than the spring. If the plate is three times thicker, it will be 27 times stiffer than if it had the same thickness as the spring, and therefore will remain much flatter than it otherwise would during vibration. If the distance across the vibrating plate can be increased by a factor of 4 over what can otherwise by achieved under a given space condition, the damping will increase by a factor of 64. The circular geometry also lends itself to other features that increase damping.

BRIEF DESCRIPTION OF THE DRAWINGS

The accompanying drawings, which are incorporated in and form a part of this specification, illustrate embodiments of the invention and, together with the description, serve to explain the principles of the invention. In the drawings.

DESCRIPTION OF THE PREFERRED EMBODIMENTS

Figure 1A:
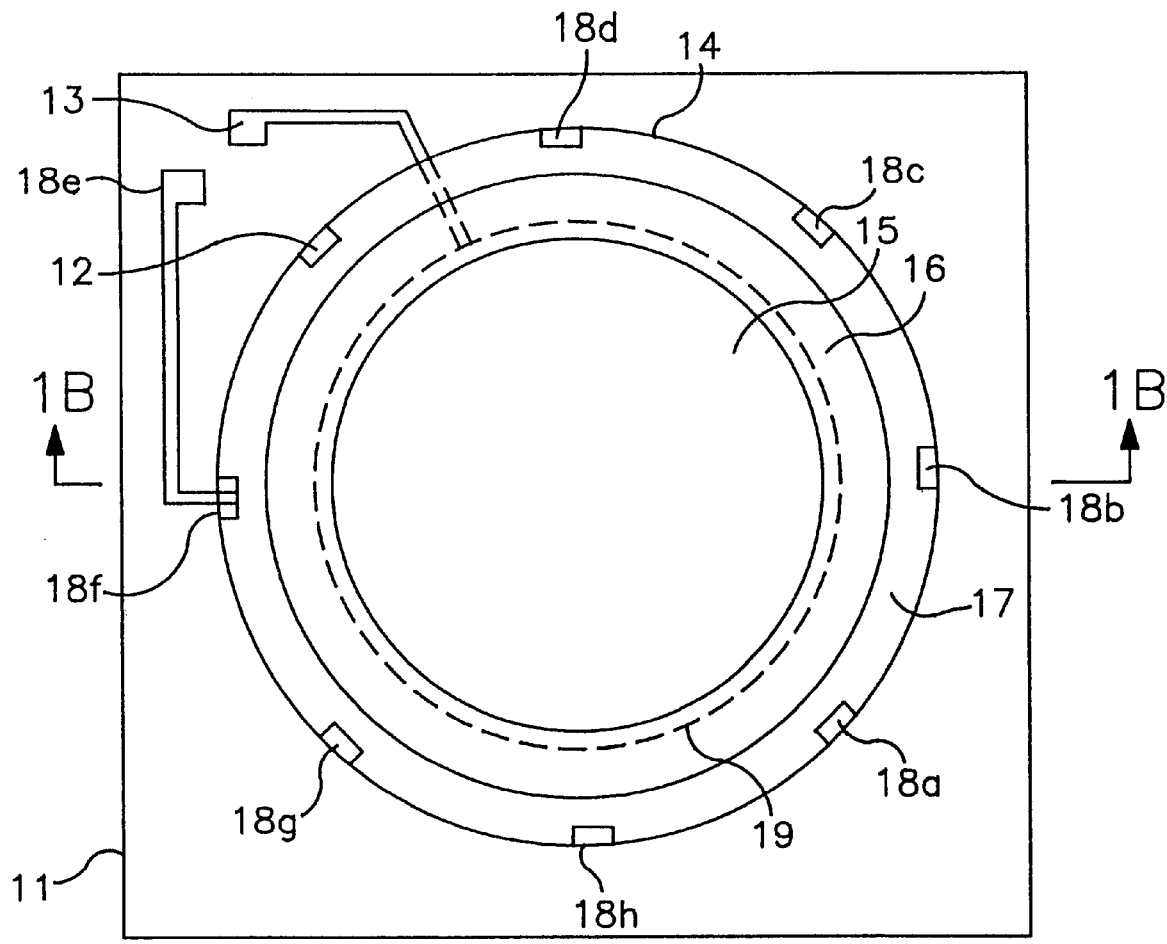
FIG. 1A is a plan view of a pressure sensor embodying the present invention.
Figure 1B:
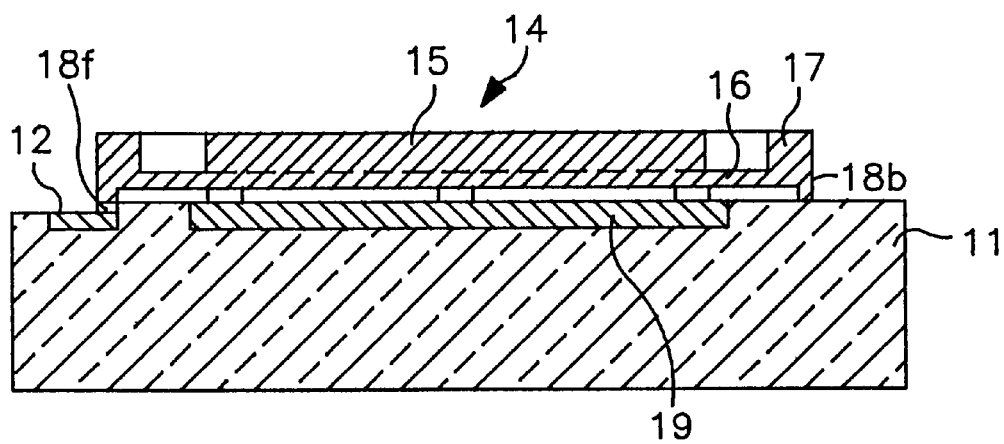
FIG. 1B is a sectional view of the embodiment shown in FIG. 1A and taken along line 1B—1B.

FIGS. 1A and 1B show a pressure gauge according to a first embodiment of the invention with an assembly 14 which is composed of a circular planar mass 15, a spring 16 and a support ring 17, and is bonded to a substrate 11 through standoff mesas 18a, 18b, 18c, 18d, 18e, 18f, 18g and 18h. This configuration serves to achieve a flow restriction for the gas by blocking off some of the open area under the periphery of the outer support ring 17. These standoff mesas serve to block the flow of gas into and out of the space between the circular planar mass 15 and the substrate 11, the amount of the blockage being a function of the percentage of the circumference blocked by the standoff mesas. In the example shown, the blockage is small, but it can be increased by increasing the length of the individual mesas or their number. Numeral 19 indicates a substrate electrode connected to the sensor electronics via a conductor and a pad 13. Electrical connections to the mass-and-spring system (or the assembly 14) is made through another conductor and another pad 12. The substrate 11 is typically made of a low expansion glass material such as Pyrex glass. The circular planar mass 15, the spring 16 and the outer support ring 17 are typically made from boron doped silicon. The substrate metallization, which serves as the substrate electrode 19, the conductors and the pads 12 and 13, typically comprise the layers of titanium, platinum and gold. Other materials may be used for the different parts of the sensor, as taught in the U.S. patent '939.

The gas flow path may be constricted also by making the spacing between the peripheral spring support band and the substrate 11 less than the spacing between the circular planar mass 15 and the substrate 11. This may be done, for example, by providing an annular mesa under the outer support ring 17 and mounting mesas under this annular mesa. If the combined height of the annular mesa and the mounting mesas is 1 micron, the spacing between the vibrating circular planar mass 15 and the substrate 11 is 2 microns but the open area under the spring outer support ring 17 is 1 micron, thereby resulting in a restriction to the gas flow. This method is beneficial in that the smaller peripheral clearance acts as a particle filter, preventing potentially harmful particles from getting under the mass-and-spring system to cause a malfunction.

Figure 2:
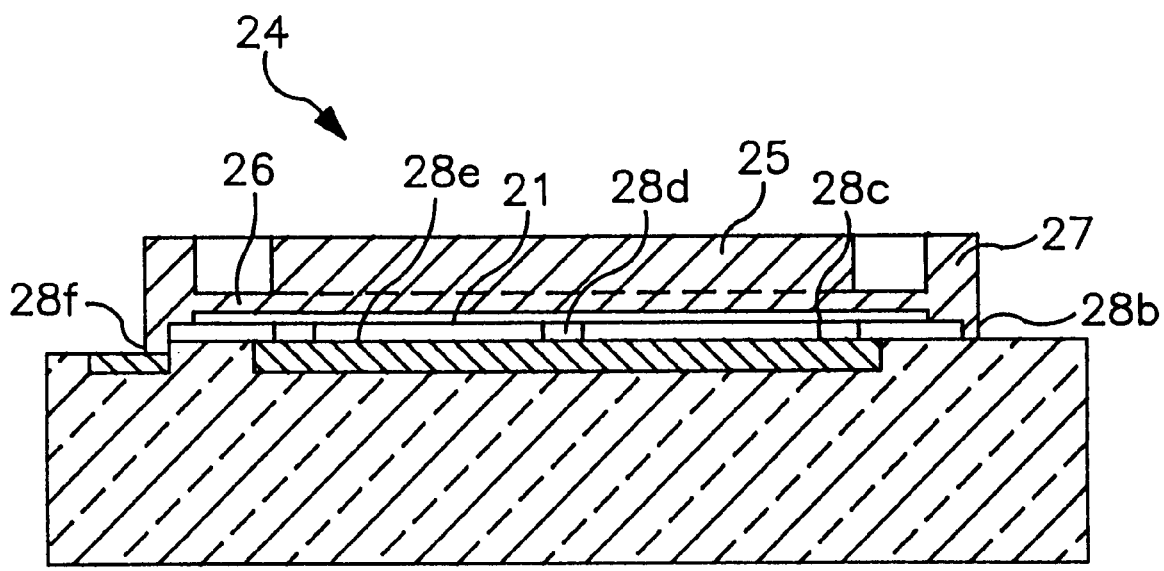
FIG. 2 is a sectional view of another pressure sensor embodying the present invention.

FIG. 2 shows a pressure gauge according to a second embodiment of the invention, utilizing the method of constricting the gas flow. This pressure gauge though similar to the one described above with reference to FIGS. 1A and 1B, has a different design of a support ring 27 which comprises a downwardly extending peripheral portion 21 which protruding below the plane of a circular mass 25. The extended peripheral portion 21 provides a part of the mass to substrate clearance, and the supporting mesas (i.e., those indicated by 28b, 28c, 28d, 28e and 28f and those not visible) provide the rest of the clearance. The mesas are preferably integral to an assembly 24 comprising the circular mass 25, a spring 26 and the support ring 27, made of the same piece of silicon.

The other way to restrict the gas flow path is to completely seal the periphery against molecular flow and to provide a hole or holes through the mass and/or the spring. A particularly interesting variation on this method is to put a single hole through the center of the mass. The hole in this position not only can restrict the flow, but the flow also reverses direction from normal squeeze damping. In normal squeeze damping, the cross-sectional area through which the gas flows increases along with the amount of gas flowing as one goes to areas of larger radii. When the gas is forced to flow through the center rather than peripherally, the opposite is true, and this has the effect of further restricting the flow in the squeeze damped volume.

Figure 3A:
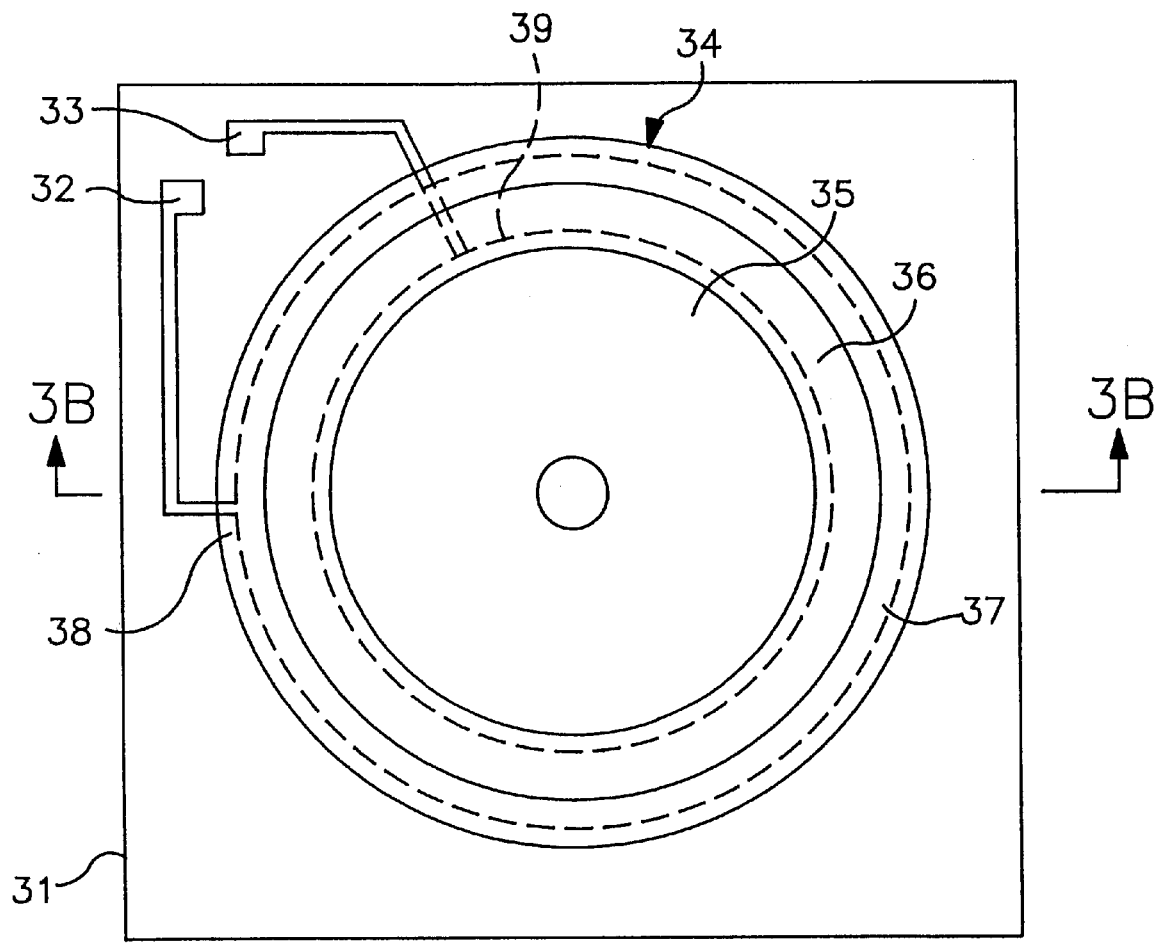
FIG. 3A is a plan view of still another pressure sensor embodying the present invention.
Figure 3B:
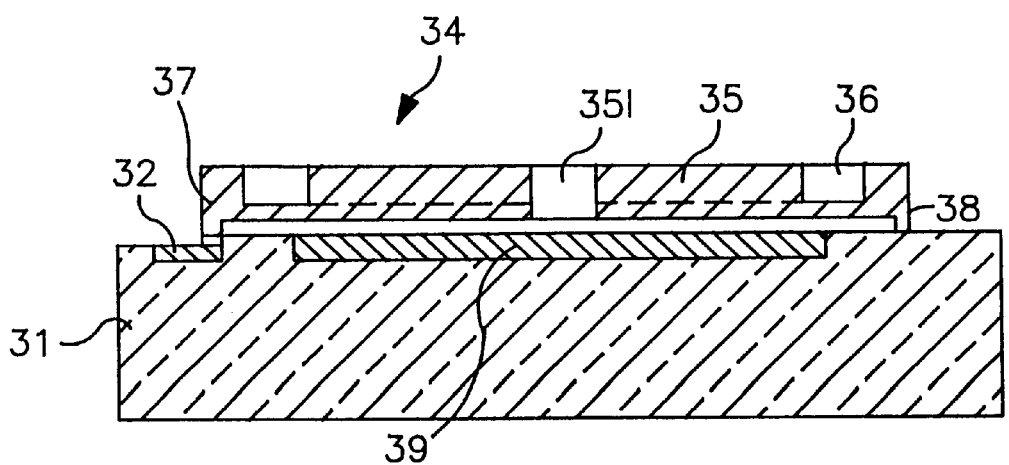
FIG. 3B is a sectional view of the embodiment shown in FIG. 3A and taken along line 3B—3B.

In FIGS. 3A and 3B, numeral 34 indicates an assembly comprising a circular diskshaped mass 35, a spring 36 and a support ring 37. The mass 35 has a hole 351 through its center, and the support ring 37 has a downward extension 38 which is completely sealed around its periphery to a substrate 31. A conductive pad 33 connecting to a substrate electrode 39 is buried in the substrate 31 to avoid shorting to the support ring extension 38. The extra processing for this buried electrode 39 can be avoided by providing a very small passage through the support ring extension 38 for the electrode. Numeral 32 indicates a pad for external electrical connection to assembly 34. Numeral 33 indicates the pad and conductor connected to substrate electrode 39.

The optimum size for the molecular flow restriction (or restrictions) depends on their locations, the shape and volume of the squeeze space, the operation frequency and the amount of a non-squeeze volume with which the squeeze volume communicates. One example of nonsqueeze volume is the volume under the support ring, and this type of volume should be minimized unless it is an intentional part of the flow restriction. The object of the restriction is to cause the vibrating member to do more work pumping the gas. However, if the restriction to flow is too great, gas is not pumped in and out of the squeeze space. The gas will simply act as a spring and the squeeze damping effect will be lost.

Squeeze damping can be doubled if a second fixed surface is placed on the side of the mass opposite the substrate at the same distance as that between the substrate and the mass. This can serve to reduce by a factor of two the lowest pressure that can be read by the sensor.

The geometry of the top electrode opens up the possibility of further increases in damping. If the sensor is built with its mass lying on the substrate and the electrode on the opposite side is used to lift the mass off the substrate, the distance between the mass and the substrate can be decreased over that for normal construction and operation. If the distance during operation between the mass and the substrate is, for example, halved, the damping will be increased by a factor of 8 without counting the added damping caused by the second electrode.

Figure 4A:
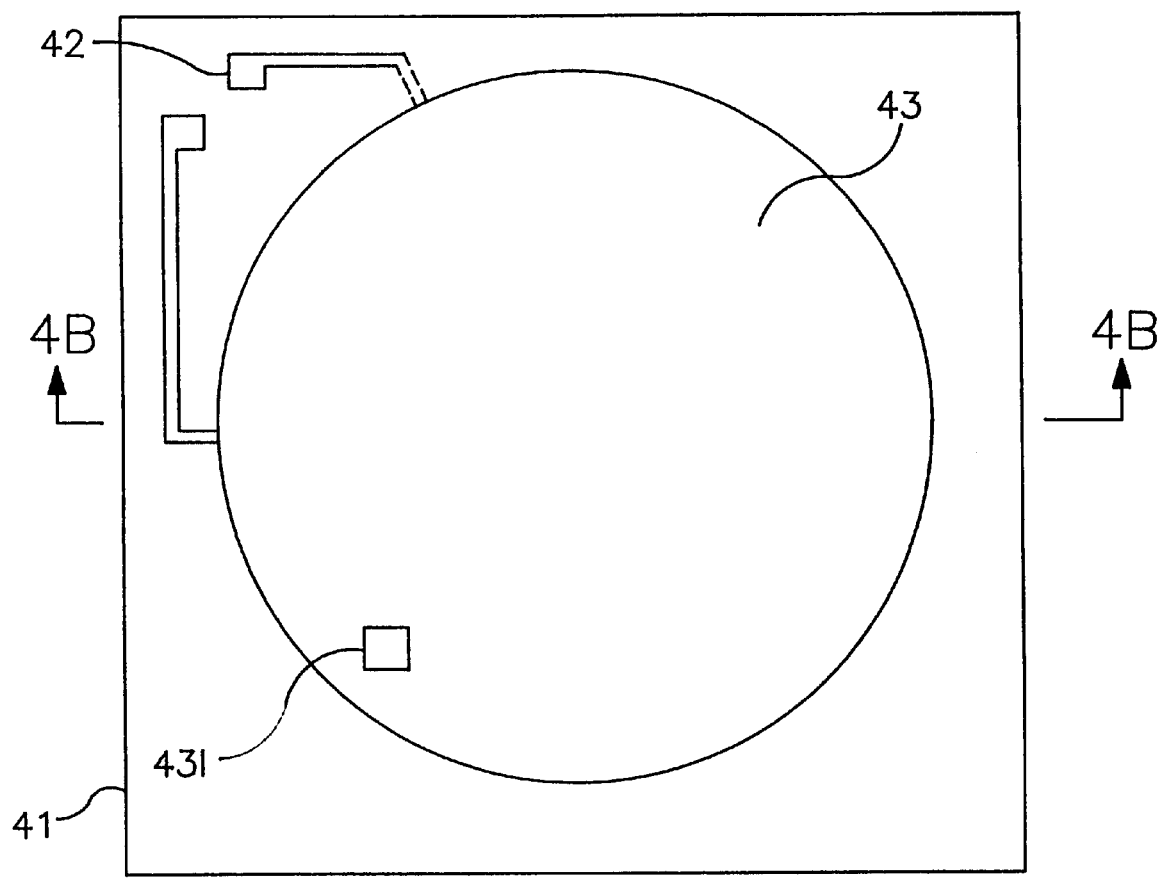
FIG. 4A is a plain view of yet another pressure sensor embodying the present invention with a top electrode.
Figure 4B:
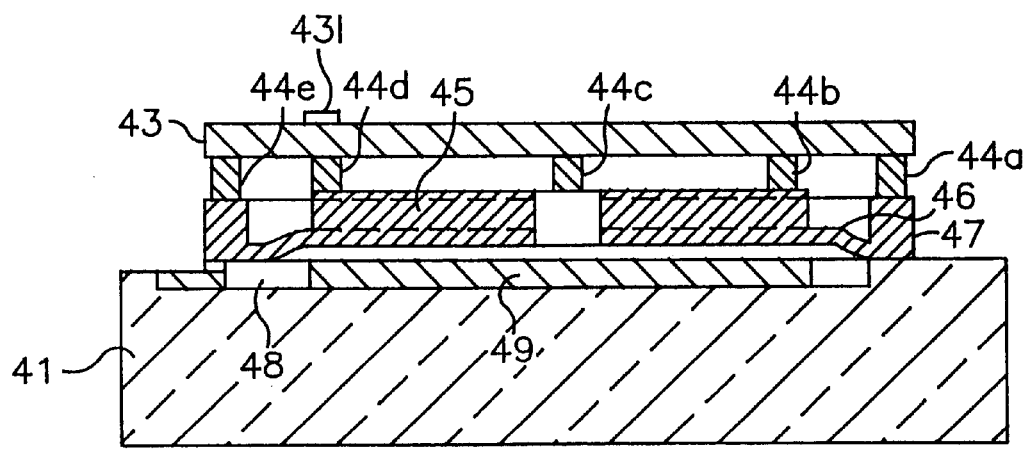
FIG. 4B is a sectional view of the embodiment shown in FIG. 4A and taken along line 4B—4B.

FIGS. 4A and 4B show pressure sensor embodying this aspect of this invention. The pressure sensor of this embodiment comprises a top electrode 43 above a vibrating planar mass 45. According to the example shown in FIG. 4B, there is a slight depression 48 on a substrate 41 for accommodating therein a substrate electrode 49 and also for ensuring that the outer edge of an annular spring 46 around the vibrating planar mass 45 does not contact the substrate 41 during operation to thereby cause undesired damping. A support ring 47 is bonded to the top surface of the substrate 41. A conductor pad 42 for connection to the substrate electrode 49 is buried in the substrate 41 so as to prevent shorting to the support ring 47. The top electrode 43 is of the shape of a circular disk, preferably of doped silicon, and is attached to the top of the support ring 47 by support pads (of which only those indicated by 44a, 44b, 44c, 44d and 44e are visible in FIG. 4B) made of an electrically insulative material such as glass. These glass pads may be formed on the top electrode 43 by silk screening technique and sintered in place or by photoetch of a deposited layer. The top electrode 43 can then be positioned and then attached by another glass sintering cycle. A wire bond pad 431 is provided on the top surface of the top electrode 43 to allow its external connection. A voltage applied between the mass 45 and the top electrode 43 exerts a force on the mass 45 and lifts it off the substrate electrode 49, thereby allowing its operation at a very small clearance without the potential for snap down. FIG. 4B shows the mass 45 being pulled off the substrate electrode 49. The mass 45 can be driven by the substrate electrode 49 or the top electrode 43.

An extra electrode may be used to create a closer spacing in a sensor designed to operate at pressures approaching atmospheric pressure. Any decrease in spacing will result in a proportional increase in the highest pressure that can be read with the sensor. For high pressures, not only must the spacing be on the order of the mean free path or less, the damping must also be kept low. This means that squeeze damping must be avoided, and this can be accomplished by driving the sensor element parallel to the substrate.

Figure 5A:
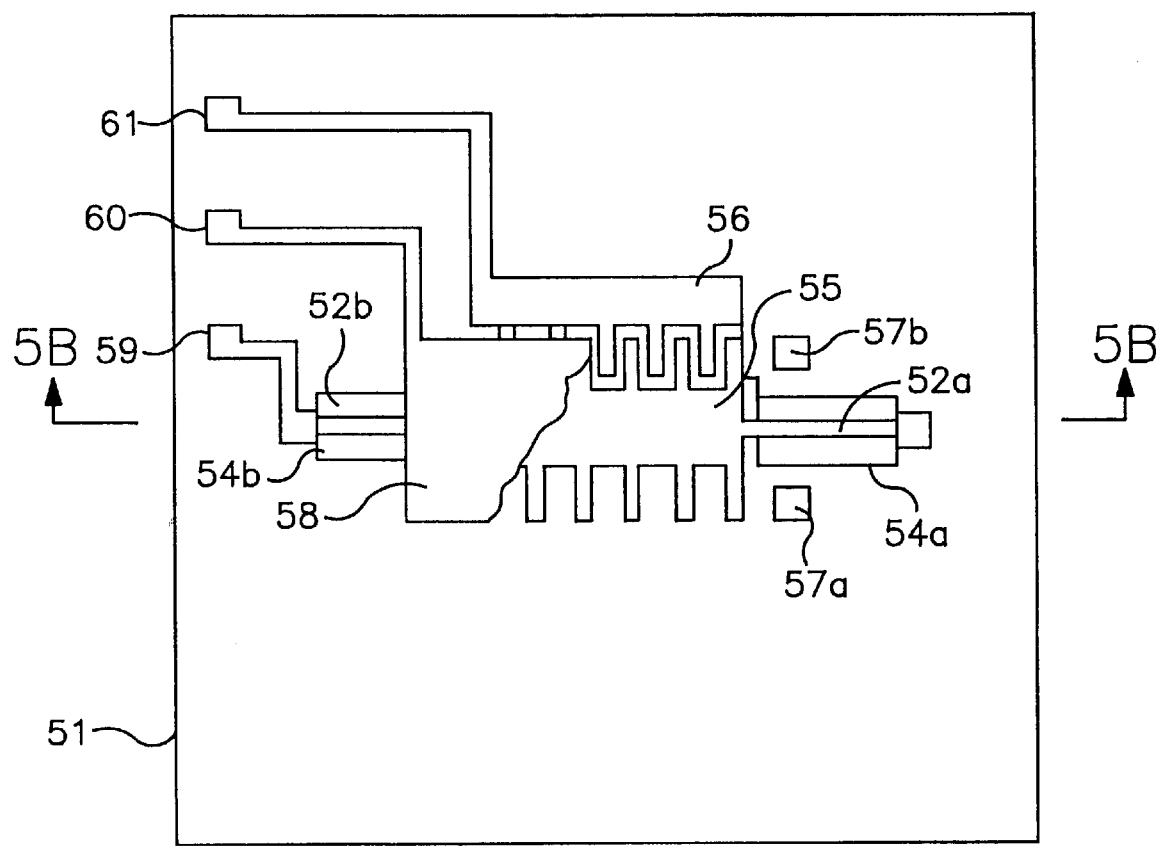
FIG. 5A is a plan view of still another pressure sensor embodying the present invention with its top electrode partially removed for the convenience of illustration.
Figure 5B:
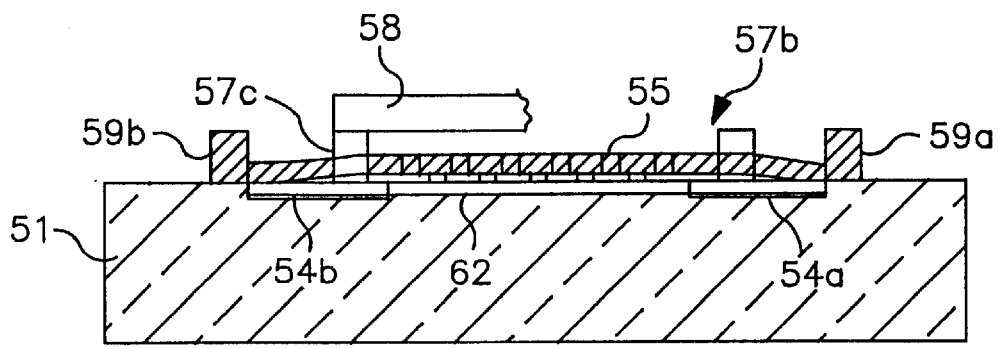
FIG. 5B is a sectional view of the embodiment shown in FIG. 5A and taken along line 5B–5B.

FIGS. 5A and 5B show such a sensor, adapted to have its mass 55 driven parallel to its substrate 51 by a comb drive electrode 56 to avoid squeeze damping. A top electrode 58, which is shown partly cut away, is mounted by a gold silicon bond or other electrically conductive means to pedestals 57 (of which only those indicated by 57a, 57b and 57c are shown) and is used to lift the mass 55 off its rest position in contact with and against the substrate electrode 62. The pedestals 57 are made from the same piece of silicon as the assembly comprising the mass 55 and springs 52a and 52b and mounting structures 59a and 59b. FIG. 5B shows the mass 55 at its lifted position from the substrate electrode 62 with a bias applied. Depressions 54a and 54b formed in the substrate 51 ensure that the springs 52a and 52b do not contact the substrate 51 to thereby cause unwanted damping. Conductor pads 59, 60 and 61 connect respectively to the mass 55, the top electrode 58 and the comb drive electrode 56. The ability to lift the mass 55 just enough to prevent mechanical contact ensures operation at a minimum spacing which in turn allows the sensor to function at the highest possible pressure.

The invention has been described above with reference to only a limited number of examples, but these examples are intended to be illustrative, not as limiting the scope of the invention. Many modifications and variations are possible within the scope of the invention. In the embodiment shown in FIGS. 4A and 4B, for example, the top electrode 43 may also be a metallized Pyrex structure. The top electrode 43 can alternatively be mounted directly to the substrate 41 instead of the support ring 47, or it may be mounted to separate pedestals that are is applied to the substrate 41 at the same time when the support ring 47 is bonded to the substrate 41. The scale of the elements in all of the figures is not consistent as some of the clearances and thickness dimensions are too small to show to scale. In FIGS. 5A and 5B, for example, the clearance between the mass 55 and the substrate 51 may be ½ micron while it is 2 microns between the mass 55 and the top electrode 58. The thickness of the mass 55 may be about 10 to 50 microns.

Control of the mass-to-substrate distance also offers an electrical method for adjusting the damping, which is in turn an electrical method for calibrating a gauge to have a specific quality factor Q at a specific pressure. The method is also adequately applicable to a system that has only the substrate and mass electrodes. For example, each of a large number of sensors has slightly different spring dimensions, a slightly different mass and slightly different mass-to-substrate spacing. The effect of these differences will result in a difference in the Q observed for each sensor under a particular operating condition and at a particular pressure. The Q can be changed by changing the distance between the vibrating mass and the closest stationary member which can be done by changing the operating bias. By calibrating the Q at a specific pressure, the gauge with a particular sensor is effectively calibrated over its whole range of operation.

In summary, all such modifications and variations of the disclosure that may be apparent to a person skilled in the art are intended to be within the scope of the invention shown in the appended claims.

What is claimed is:

1. A micromechanical pressure sensor comprising:

a stationary insulative substrate having a planar surface with a planar substrate electrode thereon connected to an externally connectable pad;

a support ring affixed to said stationary insulative substrate through a plurality of mutually separated mesas distributed circumferentially along said support ring;

a vibrating circular disk-shaped conductive mass connected to another externally connectable pad, said mass being supported inside said support ring by an annular spring attached to said support ring, said planar surface of said substrate and said vibrating mass having a space therebetween with a clearance less than the mean free path of molecules of a gas in said space, wherein said vibrating conductive mass can operate in an extended molecular drag regime and wherein said mesas serve to restrict said gas flowing into and out of said space; and said support ring further comprising a peripheral extension which protrudes towards said stationary substrate such that said clearance is greater than a separator between said peripheral extension and said planar surface of said stationary substrate and the flowing gas is further restricted.

2. The micromechanical pressure sensor of claim 1, wherein said annular spring is thinner than said disk-shaped conductive mass.

3. The micromechanical pressure sensor of claim 1, where said clearance is about 2 microns or less and said separation between said extension and said planar surface of said substrate is about half or less of a dimension clearance.

4. A micromechanical pressure sensor comprising:

a stationary insulative substrate having a planar surface with a planar substrate electrode thereon connected to an externally connectable pad;

a support ring affixed to said substrate through a ring extension protruding from peripheral edges of said support ring to said planar surface of said substrate and substantially surrounding said substrate electrode therein; and a vibrating circular disk-shaped conductive mass having a hole therethrough and being connected to another externally connectable pad, said vibrating circular conductive mass being supported inside said support ring by an annular spring attached to said support ring, said planar surface of said substrate and said vibrating conductive mass having a space therebetween with a clearance less than the mean free path of molecules of a gas in said space wherein said vibrating conductive mass can operate in an extended molecular drag regime.

5. The micromechanical pressure sensor of claim 4, wherein said hole is formed at the center of said disk-shaped conductive mass.

6. The micromechanical pressure sensor of claim 4, further comprising:

a top electrode which is planar and disposed above and parallel to said disk-shaped conductive mass; and a plurality of support pads which are attached to said support ring and support said top electrode above said vibrating conductive mass.

7. The rnicromechanical pressure sensor of claim 6, wherein said top electrode has thereon a connector pad for external electrical connection, said top electrode being made of doped silicon, and said support pads being made of low temperature glass.

8. The micromechanical pressure sensor of claim 7, wherein a depression is formed on said substrate to accept said substrate electrode therein and to ensure no contact between the spring and the substrate.

9. A micromechanical pressure sensor comprising:

a stationary insulative substrate having a planar surface;

a vibrating conductive mass connected to an externally connectable pad;

mass supporting means for supporting said vibrating conductive mass parallel to and in proximity of said planar surface of said stationary insulative substrate;

drive electrode means for causing said vibrating mass to vibrate parallel to said planar surface; and a top electrode which is planar and disposed above and parallel to said vibrating conductive mass and serves to lift said vibrating conductive mass away from said top surface of said substrate electrode such that said planar surface of said substrate electrode and said vibrating mass form a space therebetween with a clearance comparable to or less than the mean free path of molecules of a gas in said space, wherein said vibrating mass can operate in an extended molecular drag regime.

10. The micromechanical pressure sensor of claim 9, further comprising electrically conductive pedestals attached to said substrate for supporting said top electrode.

11. The micromechanical pressure sensor of claim 9, wherein said vibrating mass and said substrate are separated by about 0.2 microns and said mass and said top electrode are separated by about 2 microns.

* * * * *